United States Patent [19]

Andruska et al.

[11] Patent Number: 5,937,035
[45] Date of Patent: Aug. 10, 1999

[54] INTERSWITCH TELEPHONE STATUS MONITORING

[75] Inventors: Donald Lee Andruska, Glen Ellyn; Eugene William Foster, Naperville, both of Ill.

[73] Assignee: Lucent Technologies Inc., Murray Hill, N.J.

[21] Appl. No.: 08/929,022

[22] Filed: Sep. 15, 1997

[51] Int. Cl.[6] .......................... H04M 1/24; H04M 15/00
[52] U.S. Cl. ............................................. 379/34; 379/134
[58] Field of Search ................................. 379/34, 35, 133, 379/134, 135, 136, 156, 157, 201, 207, 219, 220, 229, 230, 231, 245, 246, 254, 265

[56] References Cited

U.S. PATENT DOCUMENTS

| | | | |
|---|---|---|---|
| 5,309,028 | 5/1994 | Brown et al. | 379/201 |
| 5,351,287 | 9/1994 | Bhattacharyya et al. | 379/35 |
| 5,392,345 | 2/1995 | Otto | 379/220 |
| 5,590,171 | 12/1996 | Howe et al. | 379/35 |

*Primary Examiner*—Paul Loomis
*Attorney, Agent, or Firm*—Werner Ulrich

[57] ABSTRACT

A method and apparatus for monitoring stations from a monitoring terminal wherein at least one of the monitored stations is served by a different switch than that serving the monitoring station. Changes of status are reported by a monitored station to the switch serving the monitored station and, if that switch is not the switch serving the monitoring station, the switch serving the monitored station transmits a common channel signaling (CCS) signaling system 7 (SS7) message to the switch serving the monitoring terminal. Advantageously, this permits an attendant at the monitoring terminal to serve users not connected to the switch serving the monitoring terminal.

12 Claims, 6 Drawing Sheets

INTERSWITCH TELEPHONE STATUS MONITORING

TECHNICAL FIELD

This invention relates to arrangements for monitoring the status of telephone stations from another telephone station such as an attendant station.

PROBLEM

It is common to have arrangements for monitoring telephone stations from an attendant station or terminal where both stations are served by the same central office switching system or Private Branch Exchange (PBX) or Key Telephone System (KTS). In modern systems this monitoring process is performed using messages to the monitoring (attendant) station to light lamps indicating the status of the monitored station. The attendant station typically has one lamp for each monitored station. In typical arrangements such as those offered by the central office based 5 ESS® switch service, any change of status of the monitored telephone station from among the four states of busy, idle, ringing, and ringing with busy, is reported to the monitoring station and the status of the monitoring lamp for that monitored station is changed to reflect that status change. In addition, the attendant has the capability by pushing a button associated with the monitored station to pick up a call destined for the monitored station in case the monitored station is busy or the attendant knows that the user of the monitored station is unavailable.

In the more modern arrangements such as those offered by the 5ESS® switch, some or all of the monitored stations may have two or more separate call appearances. These call appearances are not separate lines since there is only one line to the monitored station, but have the characteristics of a station with several lines in the sense that a call on one call appearance may be placed on hold while the user of the monitored station is talking on another call appearance.

In the more modern central office based systems, the call monitoring function is frequently implemented with the use of a shared call appearance feature wherein a particular call appearance is in fact available to several different lines and signals related to that call appearance are distributed to all of these lines. U.S. Pat. No. 5,309,028 teaches arrangements wherein one button and its associated lamp at a monitoring telephone is used to indicate the call status of a monitored telephone that has more than one call appearance. This call status can be idle, busy, ringing, or ringing with busy. In addition this monitoring is currently provided on an intraswitch basis. The overall result is a highly flexible arrangement for monitoring a variable number of monitored stations from one or more attendant stations.

A problem of the prior art is that this arrangement is restricted to systems wherein all the monitoring and monitored lines are served by the same central office switching system; PBX, or KTS. There is an unmet need for a monitoring station to monitor stations not served by the same switch. One example of the need is with regard to work at home arrangements wherein attendant services are required for people who sometimes or always work out of their home offices, which are unlikely to be served from the same switching system as the switching system that serves the monitoring station. Another example of the need is where a number of monitored stations representing a similar function, for example, stations for county agricultural agents of one state, are scattered over a wide geographic area and therefore not servable by a single switching system; it would still be highly desirable to have a common attendant serve these agent stations since the common attendant would be able to direct incoming calls to the most appropriate back-up agent. Unless calls can be equitably distributed among many switches, work-at-home agents could not be effectively used.

A problem of the prior art, therefore, is that economical telephone monitoring arrangements are restricted to groups of monitoring and monitored stations, all of which are served by a common switching system.

Solution

The above problem is solved and an advance is made over the prior art in accordance with the teachings of this invention wherein messages indicating a change in the status of a monitored station are transmitted from a switching system serving the monitored station over a common channel signaling (CCS) arrangement to the switching system serving the monitoring station and are then forwarded to that monitoring station. Advantageously, the monitoring station is immediately informed of any change of status of the monitored station.

In accordance with one feature of applicant's invention, if the monitoring station observes a change in the status of the monitored station and the attendant at that station decides to receive the call, the monitoring station sends a request forwarded over the CCS network to the switching system serving the monitored station to redirect the call destined for the monitored station to the monitoring station. Advantageously, this arrangement allows the attendant at the monitoring station to perform interswitch pick up of calls destined for the monitored station. As a result of being able to monitor the status of telephones connected to other switches, the attendant can perform many useful tasks. For example:

1. When the monitored party is ringing with busy, the attendant can use call pickup to answer the call and indicate to the calling party that the called party is busy on another call.

2. The attendant can wait for the monitored party to be idle before transferring any calls from the attendant to the monitored party.

3. When the monitored party is ringing, the attendant can wait a certain amount of time before using pick up to answer the call and indicate that the monitored party is not available at this time.

DETAILED DESCRIPTION

Figure 1:
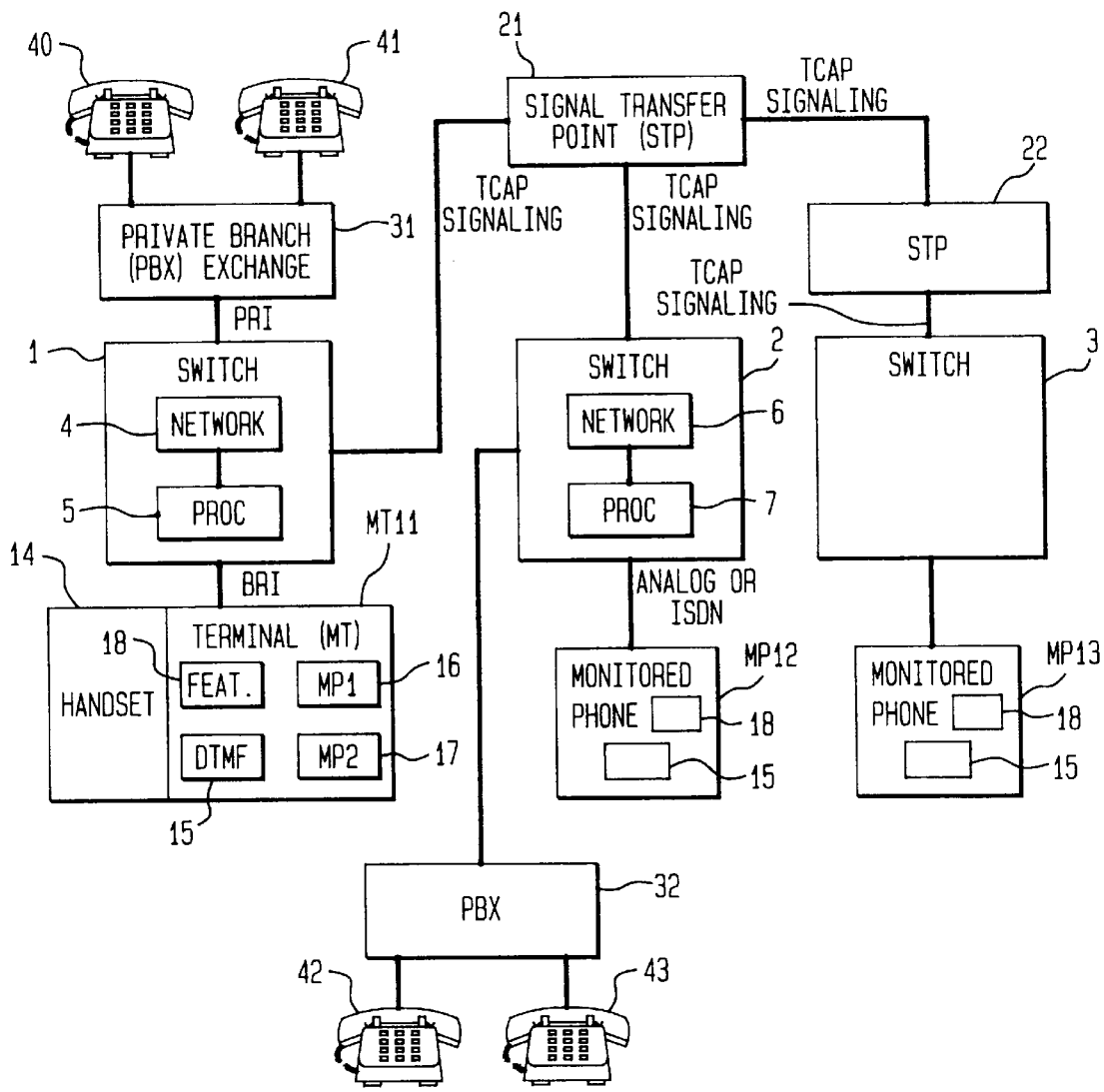

FIG. 1 is a block diagram illustrating the operation of applicant's invention. Shown are three switches, 1, 2 and 3. The three switches are located in different geographic locations and are not modules of one larger switch. Switches 1 and 2 are connected to a common signal transfer point 21, and switch 3 is connected to a different signal transfer point 22. Messages between the switches are sent over the links to the signal transfer points using Signaling System 7 (SS7) Transaction Capabilities Application Part (TCAP) signaling. The two signal transfer points are part of a larger common channel signaling network used to communicate signaling points are part of a larger common channel signaling network used to communicate signaling messages among switching systems of the public switched telephone network.

Each of the switches includes a switching network for connecting calls, processor means for controlling the switching network and for controlling signalling to other switching systems and to telephone terminals and stations. FIG. 1 shows, respectively, control processors 5 and 7 and switching networks 4 and 6 of switches 1 and 2.

Switch 1 is connected to the monitoring terminal (MT) 11. This monitoring terminal has a handset 14, a dual tone multifrequency (DTMF) key pad 15, feature buttons 18, and buttons 16 and 17 for monitoring monitored phones MP12 and MP13 respectively. Monitored phone MP12 is connected to and served by switch 2. Monitored phone MP13 is served by switch 3. In applicants' preferred embodiment, the monitoring terminal MT11 is an integrated services digital network (ISDN) terminal connected to switch 1 over a facility that implements a basic rate interface (BRI). The basic rate interface can be in accordance with national standards as promulgated by Bellcore or it can be a custom ISDN interface. The messages exchanged between the MT and switch 1 are in conformance with the standards of the BRI.

MP12 and MP13 can be ISDN telephones or simple analog telephones. If either MP12 or MP13 has more than one call appearance, then an ISDN telephone would probably be preferred. An ISDN telephone is connected to its switch over a BRI facility. Each of the switches 1, 2 and 3 must have the capability of converting between signals received from their connected stations and the TCAP or ISUP signals required to signal over the CCS network. The CCS network in applicant's preferred embodiment uses SS7 signaling, the international standard.

Details of the operation will be explained with respect to the flow charts of the following figures, but are briefly summarized here. If a station such as station MP12 originates a call, the origination is detected by the connected switch such as switch 2. This switch transmits a message over the CCS network, i.e., via STP 21 to switch 1, connected to monitoring terminal 11. Switch 1, upon receipt of this status change message, sends a message to monitoring terminal 11 to change the status of the light 16 to reflect the fact that the line is now busy. The light is a feature button lamp which is visible through a transparent button. The light in applicant's preferred embodiment, has four states, busy equals lamp on steady; idle equals lamp off; ringing equals flashing; and ringing but busy equals winking. (In commercial systems, flashing is 500 milliseconds (ms.) on, 500 ms. off; winking is 200 ms. on, 50 ms. off.) Accordingly, when the message is received the button lamp is turned on to reflect the change to busy. If a subsequent call to another station known by the attendant to be temporarily unattended, then comes in, the attendant will know that incoming call should not be transferred to monitored phone 12.

If an incoming call is directed to monitored phone 12 while that phone is idle, the status changes from idle to ringing. The attendant can either decide directly to redirect the call to the monitoring (attendant) terminal 11 if the attendant knows that monitored phone 12 is presently unattended, or the attendant can wait for a number of rings before redirecting the call to monitoring terminal 11.

The ringing with busy status is used when the monitored station is an ISDN station with two or more call appearances. In that case, ringing with busy is a meaningful status because if one of the call appearances is idle, then that call appearance is alerted and the calling customer receives audible tone. Under these circumstances the called line can pick up on the ringing call appearance or the attendant at the monitoring station can redirect the incoming call to the monitoring station. Note that if the called monitored station is an analog station without call waiting, if that station is busy, the calling customer simply receives normal busy treatment and the monitoring terminal never finds out. Similarly, if the monitored station has call waiting, the status of the monitored station does not change from busy if the monitored station has received a first call and is now receiving a second call and switches back and forth between the two; the only status change would take place when the monitored station disconnects.

Consequently, if the monitored station is an analog station (having only a single call appearance) the attendant can pick up the call during the ringing interval (or at the beginning of the ringing interval if the attendant knows that the user of the monitored station is unavailable) and the attendant can take advantage of the knowledge of the busy/idle status of the monitored station in deciding where to re-route a call answered by the attendant or transferred to the attendant.

If the monitored station is an ISDN station having at least two call appearances, then the attendant can do more. Specifically, the attendant can recognize the appearance of a second call when the monitored station is already busy (the ringing with busy state) because the second call would come in on a second call appearance. The attendant can then make a decision whether or not to pick up on the second call, or can pick up on the second call after a certain number of rings because the attendant recognizes that the user of the called station is not placing the initial call on hold and picking up on the second call. (If the user of the called station places the initial call on hold and picks up the second call, the state of the monitored terminal goes to simple busy and, unless the monitored terminal places a separate call from one of the call appearances to the attendant, the monitored station will handle both calls.)

For an ISDN monitored station, the following example illustrates some of the capabilities. Suppose that an incoming call comes to the attendant and the attendant decides to transfer the call to a monitored party only if that party is idle.

Some of the feature button (FB) actions involved for various scenarios are:

1. Call comes in to monitored line, attendant presses call pickup FB and then presses FB with lamp of monitored party to answer call.

2. Call comes in to attendant, attendant presses transfer FB, presses FB with lamp of monitored party, then presses transfer FB again to transfer call to monitored.

3. Attendant just presses FB with lamp of monitored party to place a call to the monitored party.

4. Attendant gets confused as to what party button 16 is monitoring. Attendant presses the INSPECT feature button, and then presses monitoring button 16 and sees that it is a Terminal Status Monitoring (TSM) button for monitoring a party, e.g., MP12, with DN (directory number) of xxx-xxxx.

Figure 2:
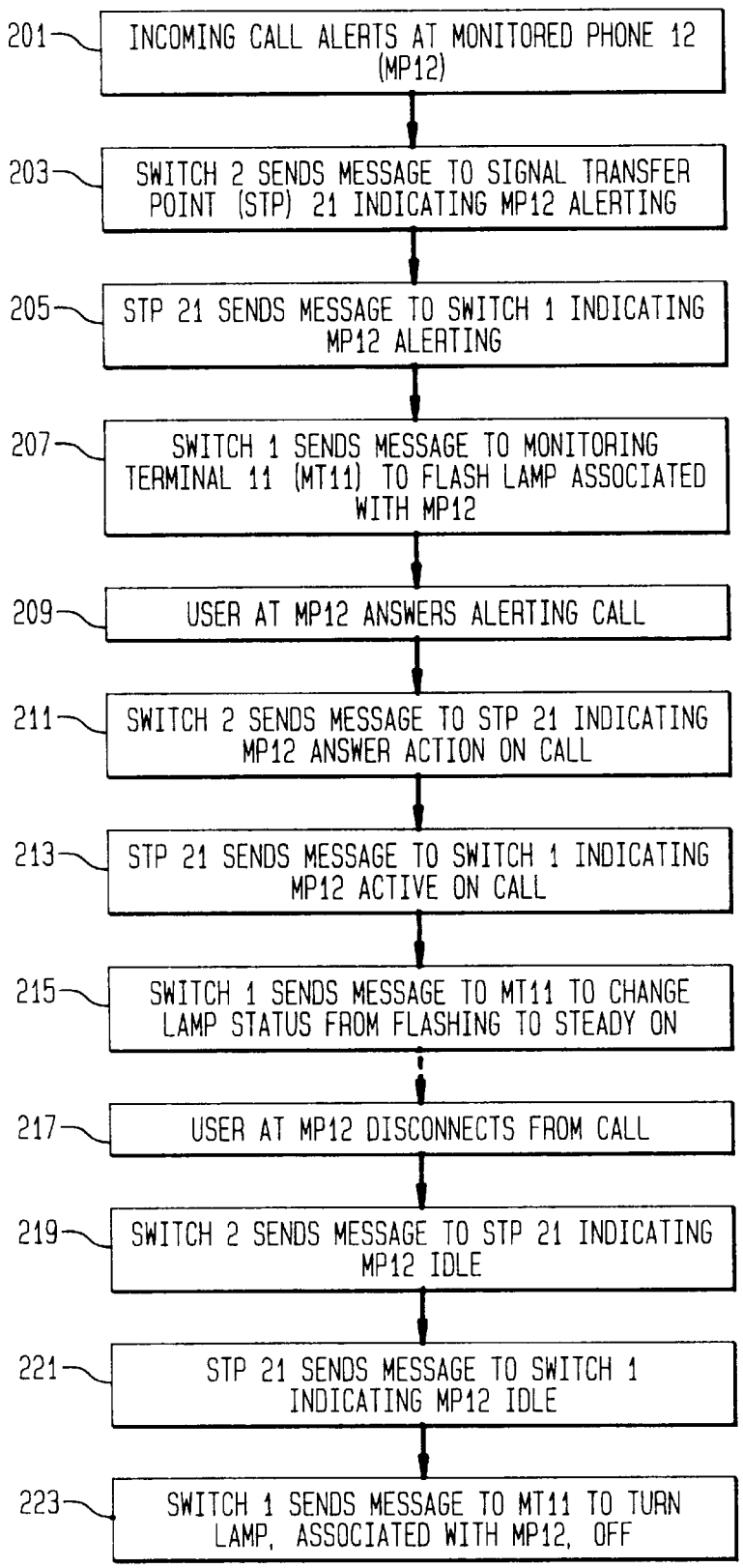

FIGS. 2–7 are flow diagrams illustrating some of the sequences that are implemented in accordance with the principles of applicant's invention. FIG. 2 illustrates the operation of an incoming call. The incoming call is detected at switch 2 which alerts the monitored phone 12 (MP12) (Action block 201). Switch 2 then sends a message to signal transfer point (STP) 21 indicating the alerting of MP 12 (Action block 203). STP 21 sends a message to switch 1 indicating the MP 12 alerting (Action block 205). Switch 1 sends a message to monitoring terminal MT 11 to flash the lamp associated with MP 12 (Action block 207). The user at MP12 answers the alerting call (Action block 209). Switch 2 sends a message to STP 21 indicating the MP12 answer action on the call (Action block 211). STP 21 sends a message to switch 1 indicating that MP 12 is active on a call (Action block 213). Switch 1 sends a message to MT 11 to change the lamp status from flashing to steady on, representing busy (Action block 215). Eventually, the user at MP 12 disconnects from the call (Action block 217). Switch 2 sends a message to STP 21 indicating that MP12 is now idle (Action block 219). STP 21 sends a message to switch 1 indicating that MP12 is now idle (Action block 221). Switch 1 then sends a message to MT11 to turn the lamp associated with MP12 off, indicating the idle state (Action block 223).

Figure 3:
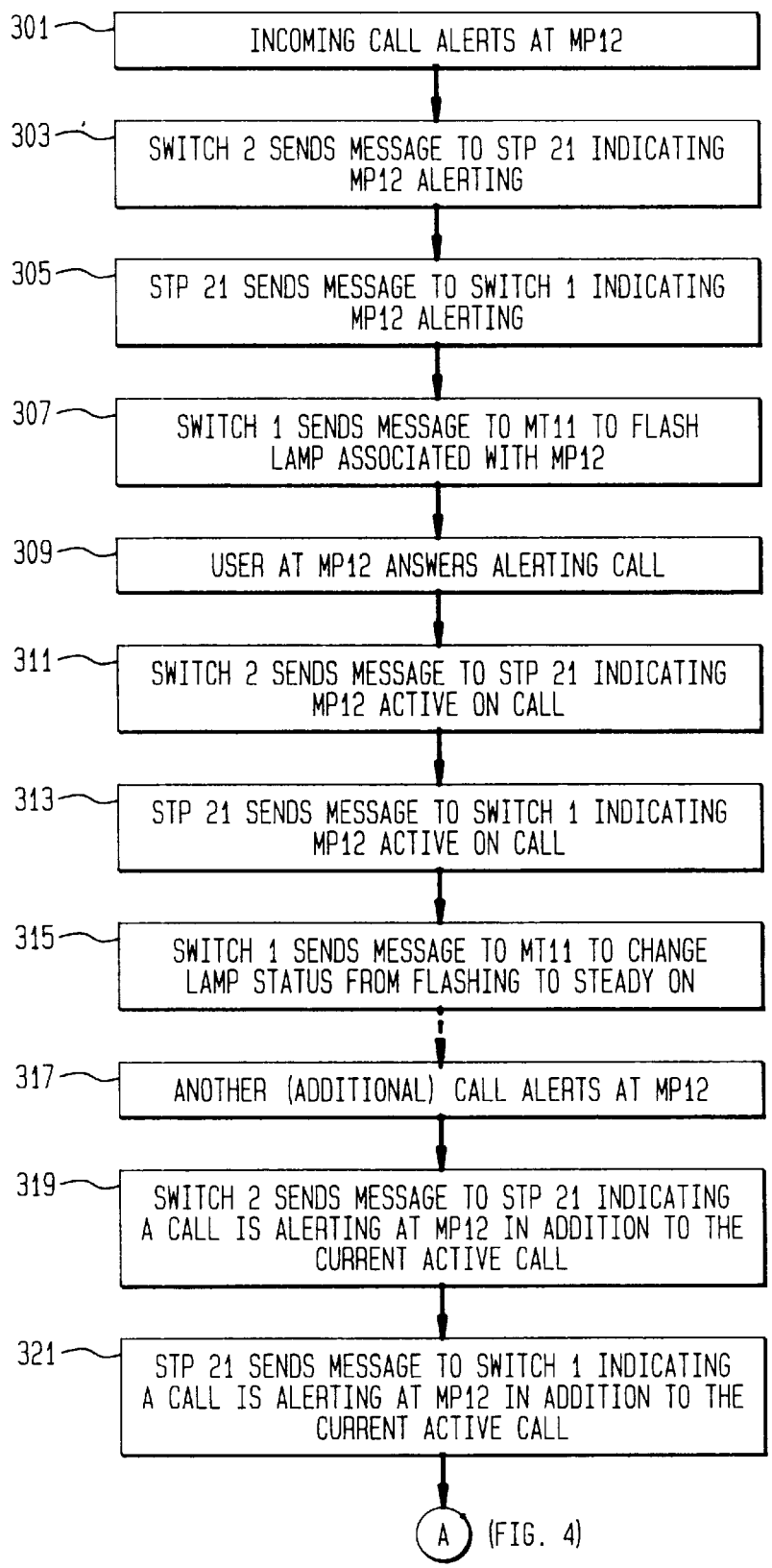
Figure 4:
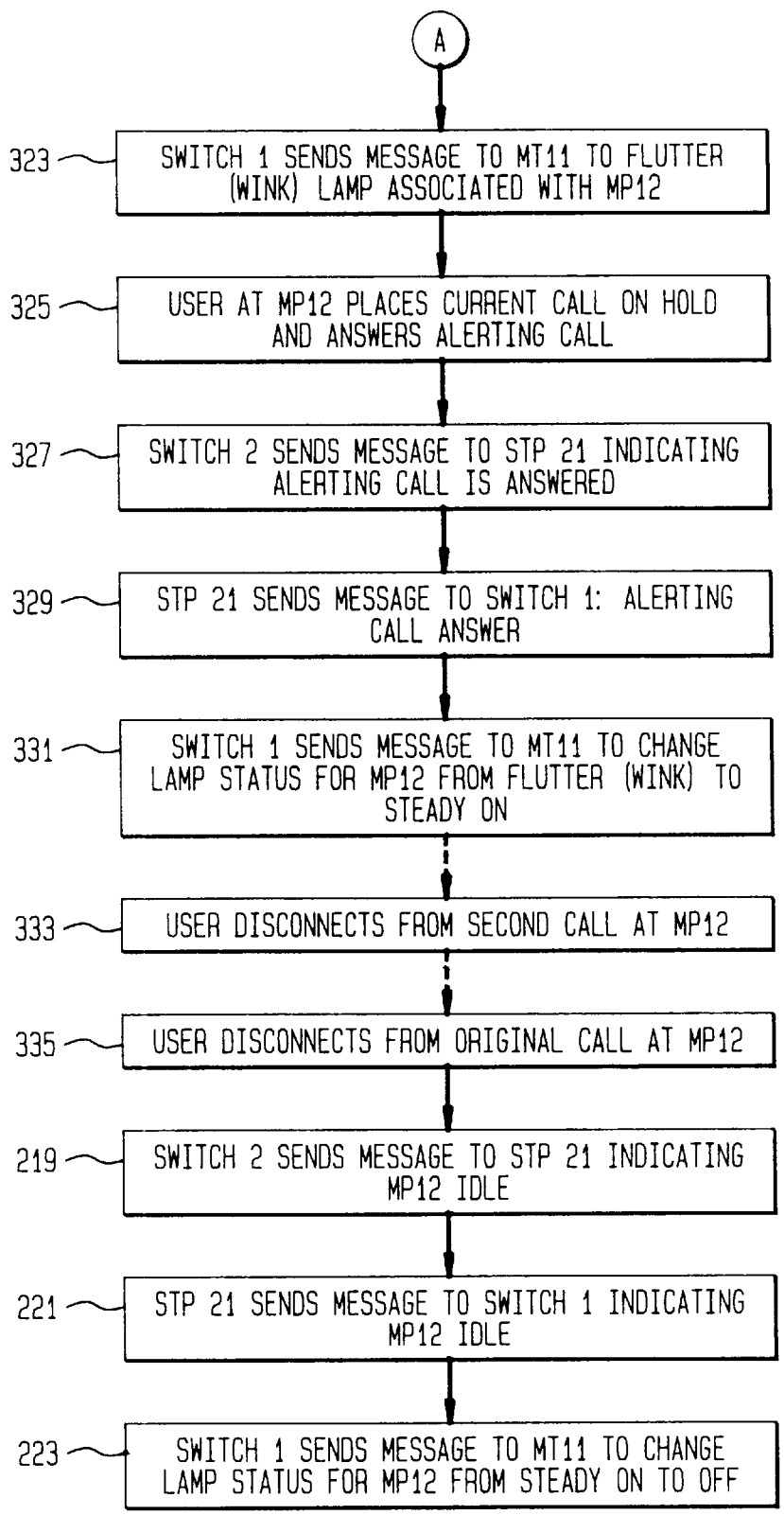

The sequence illustrated in FIGS. 3 and 4 is most readily implemented using an ISDN type station for the monitored station MP12, but with new technologies being developed which can be used for this application, such as the Asynchronous Digital Subscriber Line (ASDL) or proprietary protocol, e.g., Nortel's p-phones, MP 12 need not be an ISDN station. An incoming call alerts MP12 (Action block 301). Switch 2 send a message to STP 21 indicating the MP12 alerting (Action block 303). STP 21 send a message to switch 1 indicating the MP12 alerting (Action block 305). Switch 1 sends a message to MT 11 to flash the lamp associated with MP 12 (Action block 307). The user at MP12 answers the alerting all (Action block 309). Switch 2 send a message to STP 21 indicating MP12 is active on a call (Action block 311). STP 21 sends a message to switch 1 indicating MP12 is active on a call (Action block 313). Switch 1 sends a message to MT11 to change the lamp status from flashing to steady on (Action block 315).

Later, another (additional) call alerts station MP12. In case MP12 is an ISDN station having two call appearances the alerting will be on the second call appearance (Action block 317). Switch 2 sends a message to STP 21 indicating that a call is alerting at MP12 in addition to the current active call (Action block 319). STP 21 sends a message to switch 1 indicating that a call is alerting at MP 12 in addition to the current active call (Action block 321).

The actions of FIG. 3 are continued on FIG. 4. Switch 1 then sends a message to MT 11 to wink the lamp associated with MP12 (Action block 323). The user at MP 12 places the current call on hold and answers the alerting call (Action block 325). (Alternately, the monitoring station might have sent a message requesting that the additional call be redirected to the monitoring station, in which case the alerting signal would disappear from MP12 and the call would be redirected to MT11.) Switch 2 sends a message to STP 21 indicating that the alerting call has been answered (Action block 327). STP 21 sends a message to switch 1 indicating that the alerting call has been answered (Action block 329). Switch 1 sends a message to MT11 to change the lamp status for MP12 from wink to steady on (Action block 331). Eventually, the user of station MP12 disconnects from the second call (Action block 333) and the original call (action block 335) and switch 2 sends a message to STP 21 indicating that MP12 is idle (Action block 219, identical to Action block 219 of FIG. 2). This action is followed by action blocks 221 and 223 previously described for FIG. 2.

Figure 5:
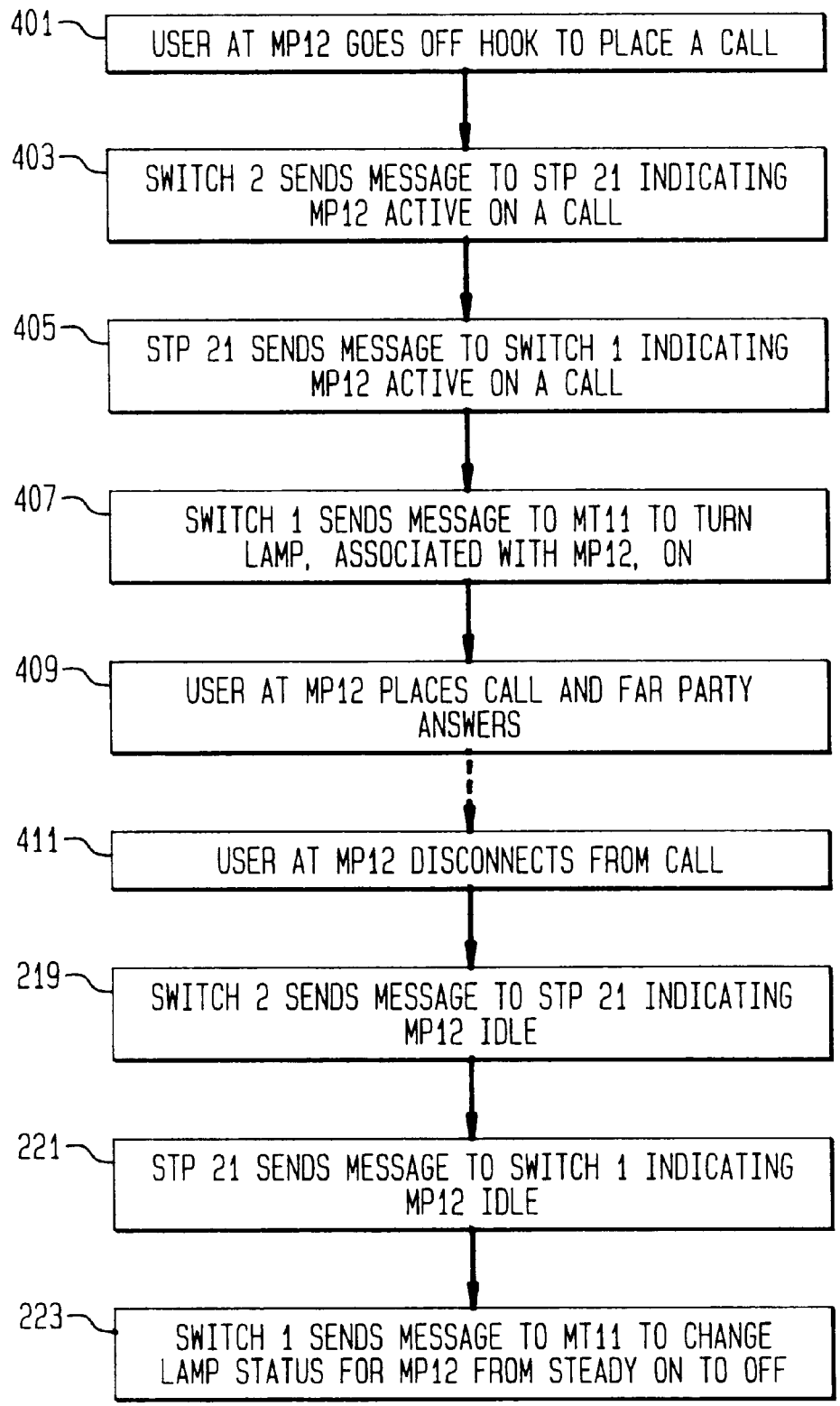

FIG. 5 illustrates the sequence of actions performed in processing an outgoing call from one of the monitored phones. The user at MP12 goes off-hook to place a call and this origination is detected at switch 2 (Action block 401). Switch 2 sends a message to STP 21 indicating that MP 12 is active on a call (Action block 403). STP 21 sends a message to switch 1 indicating that MP 12 is active on a call (Action block 405). Switch 1 sends a message to MT 11 to turn the lamp associated with MP 12 on (Action block 407). The user of MP 12 places a call and far party answers (Action block 409). Eventually the user at MP 12 disconnects from the call (action block 411). Thereafter, the actions previously described for action blocks 219, 221, and 223 of FIG. 2 are performed.

Figure 6:
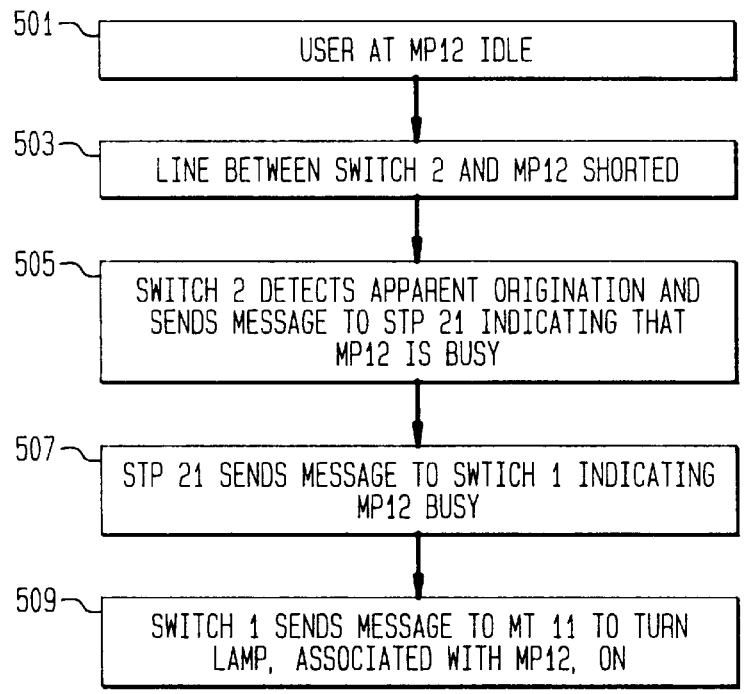

FIG. 6 illustrates the response of applicant's arrangement to a trouble condition, specifically, a short circuit across the loop of station MP12. The user at MP12 is idle initially (Action block 501). The line between switch 2 and MP12 is shorted (Action block 503). Switch 2 detects what is apparently an origination and sends a message to STP 21 indicating that MP12 is busy (Action block 505). STP 21 sends a message to switch 1 indicating that MP12 is busy (Action block 507). Switch one sends a message to MT11 to turn the lamp associated with MP12 on (action block 509).

Figure 7:
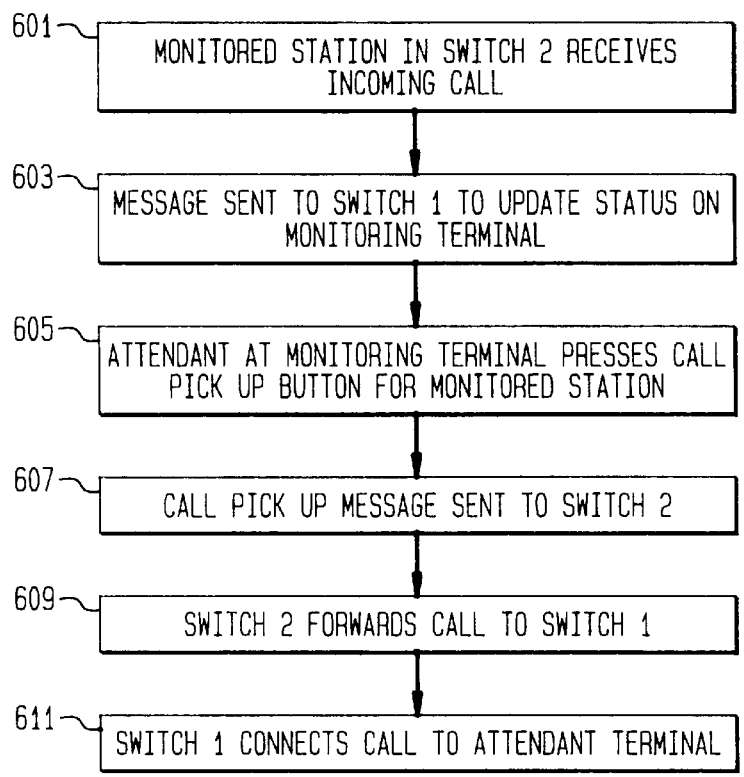

FIG. 7 illustrates the steps for call pick up. In this sequence a call is received in the monitoring station MP12 served by switch 2 (action block 601). At this time the monitoring station is either in the alerting state or, if it is already busy on a call, in the alerting on busy (lamp flutter, wink) state. A message is sent from switch 2 to switch 1 to update the status on the monitoring terminal (Action block 603). Switch 1 sends a message to update that terminal thus informing the attendant of the call. The attendant at the monitoring terminal decides to pick up the call and presses the call pick up button for the monitored station (Action block 605). The call pick up message is then sent from switch 1, which has received the indication via an ISDN message from the monitoring terminal, to switch 2, probably as a CCS ISUP message (Action block 607). Switch 2, upon receipt of that message, forwards the call to switch 1 and disconnects the call from the monitored terminal (action block 609). Switch 1 receives the call and connects the call to the attendant terminal (action block 611).

All of the above sequences have been illustrated using MP12. For the case of MP13, which is connected to switch 3 served by STP 22, the messages received by the initial STP (now STP 22) must be forwarded to STP 21 before they can be forwarded to switch 1, the switch serving the monitoring station. More generally, a common channel signaling network is connected to all three of the switches and is used to transmit signaling messages among the switches.

No monitored phones are shown as being connected to switch 1 in this simple illustration. The monitored phones connected to switch 1 are served by the monitoring terminal 11 in the same way that they are served in the prior art.

Only a single monitoring terminal is shown in FIG. 1. Several such monitoring terminals may be used in a large system; the monitoring terminals need not be connected to the same switch; in the latter case messages between the monitoring terminals and the monitored terminals are routed over a common channel signaling network to two or more destinations, the destinations being the switches that serve the monitoring terminals.

This arrangement can also be used for lines directly or indirectly connected to PBX's as long as the PBX uses SS7 protocol to communicate the appropriate information to the network and to the monitoring telephone or is connected to a switch adapted to convert the signals from the PBX to SS7 signals, e.g., via ISDN PRI.

An attendant at a monitoring station can perform a number of control actions. These actions can also be performed in accordance with the teachings of this invention since the same types of control messages are sent from and to the control of the switch that serves the monitored station as are sent from and to the control of a switch that serves both stations in the prior art. Thus, a monitoring station can pick up a call for a monitored station, can activate automatic call forwarding for calls to the monitored station, can receive caller ID for calls to that station, can transfer calls from the monitored station to another station, can barge in on calls by requesting a three way conference connection to the monitored station and the other end of a call, can camp on to the monitored station in order to be connected as soon as the monitored station is free, or the attendant station can defer billing for calls set up by the attendant to the calling party's telephone.

The above description is of one preferred embodiment of applicants' invention. Other implementations can be derived by those of ordinary skill in the art without departing from the scope of the invention. The invention is only limited by the attached claims.

We claim:

1. A method of monitoring a telephone station status from a monitoring terminal comprising the steps of:

initializing translation information of a switch for controlling said monitoring terminal to record that a status of the related monitored station is to be monitored by said monitoring station;

maintaining a status of said monitored station in a monitoring terminal;

responsive to detection of a change in the status of said monitored station, signaling said monitoring terminal information describing said change; and responsive to receipt of said information, updating, in said monitoring terminal, the status of the monitored station whose status had changed;

characterized in that said monitoring terminal is on a different switch than said monitored terminal, and that the step of signaling comprises the steps of:

detecting the status change in a switch serving the monitored station;

transmitting a signaling message from the switch serving the monitored station to the switch serving the monitoring station; and transmitting a signaling message from the switch serving the monitoring station to the monitoring station for informing the monitoring station of the status change;

wherein the switch serving the monitoring station is geographically separate from the switch serving the monitored station;

wherein the monitoring station can monitor the status of the monitored station, but not speech signals from and to said monitored station.

2. The method of claim 1, wherein said monitoring terminal monitors the status of a plurality of telephone stations, and wherein different ones of the monitored stations are served by different switches geographically separate from the switch serving the monitoring station and from each other.

3. The method of claim 1, wherein the switch serving the monitoring station is a central office switch.

4. The method of claim 3 wherein the switch serving the monitored station is a central office switch.

5. The method of claim 4 wherein the step of transmitting a signaling message from the switch serving the monitored station to the switch serving the monitoring station comprises the step of transmitting a common channel signaling message.

6. The method of claim 4 wherein the step of transmitting a signaling message from the switch serving the monitoring station to the monitoring station comprises the step of sending an ISDN control signaling message.

7. The method of claim 1 wherein the switch serving the monitored station is a private branch exchange switch.

8. The method of claim 1 wherein the switch serving the monitored station is a key telephone system switch.

9. The method of claim 1 wherein a plurality of monitoring stations serve a monitored station and wherein some of said plurality of monitoring stations are served by different switches;

wherein the step of transmitting a signaling message from the switch serving the monitored station comprises the step of transmitting a signaling message from the switch serving the monitored station to each of the switches serving stations monitoring the monitored station.

10. The method of claim 1 further comprising the step of: transmitting a signaling message from the switch serving the monitoring station to the switch serving the monitored station for changing the processing of a call to said monitored station.

11. The method claim 10, wherein the message for changing the processing of said call to said monitored station comprises commands for re-directing said call to said monitoring station.

12. A switching system for controlling operation of attendant terminals for monitoring calls on a plurality of related monitored telephone stations comprising:

a switching network for establishing connections to said monitoring terminal; and control means for controlling establishment of connections to said monitoring terminal, and for controlling the transmission of control messages to said monitoring terminal;

said control means comprising means for:

initializing translation information of said switch to record that a status of a related monitored station is to be monitored by said monitoring station; and means, responsive to detection of a change in the status of said monitored station, for transmitting to said monitoring terminal information describing said change;

characterized in that a switch serving said monitored station is geographically separate from the said switching and wherein, the means for transmitting to said monitoring terminal, information describing said change, comprises:

means for receiving a message from said switching system serving said monitored station; and means, responsive to receipt of said message from said switch serving said monitored station, for transmitting a message to said monitoring station to update a status display of said monitoring station;

wherein said monitoring station can not monitor speech signals to and from said monitored station.

* * * * *